US008195156B2

(12) United States Patent
Dunn et al.

(10) Patent No.: US 8,195,156 B2
(45) Date of Patent: *Jun. 5, 2012

(54) SYSTEM SCANNING METHOD AND ARRANGEMENT FOR MOBILE WIRELESS COMMUNICATION DEVICES

(75) Inventors: Doug Dunn, Chula Vista, CA (US); Amit Kalhan, La Jolla, CA (US); Anupam Juneja, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/724,405

(22) Filed: Mar. 15, 2010

(65) Prior Publication Data

US 2010/0172315 A1 Jul. 8, 2010

Related U.S. Application Data

(63) Continuation of application No. 11/398,421, filed on Apr. 4, 2006, now Pat. No. 7,706,790.

(51) Int. Cl.
*H04W 4/00* (2009.01)
(52) U.S. Cl. .............. 455/434; 455/552.1; 455/435.2; 455/67.11; 455/41.2; 370/329; 370/338
(58) Field of Classification Search .......... 455/552.1, 455/434, 432.1–435.2; 370/328, 338
See application file for complete search history.

(56) References Cited

U.S. PATENT DOCUMENTS

| 3,898,390 A * | 8/1975 | Wells et al. ............ 455/438 |
| 491,672 A | 4/1990 | Blair |
| 511,950 A | 6/1992 | Kallin et al. |
| 544,280 A | 8/1995 | Barber et al. |
| 5,548,818 A * | 8/1996 | Sawyer et al. ............ 455/515 |
| 573,498 A | 3/1998 | Hooper et al. |
| 575,495 A | 5/1998 | Abreu et al. |
| 576,161 A | 6/1998 | Lynch at al. |
| 587,067 A | 2/1999 | English |
| 590,595 A | 5/1999 | Bamburak et al. |
| 5,905,955 A * | 5/1999 | Bamburak et al. ............ 455/434 |
| 5,912,867 A * | 6/1999 | Miyazono ............... 369/44.27 |
| 6,075,988 A * | 6/2000 | Anderson et al. ............ 455/434 |
| 614,819 A | 11/2000 | Bridges et al. |
| 616,726 A | 12/2000 | Souissi et al. |
| 619,840 A1 | 3/2001 | Dorenbosch |
| 6,198,406 B1 * | 3/2001 | Dorenbosch ............... 340/5.1 |
| 622,304 A1 | 4/2001 | Raffel |
| 6,223,037 B1 * | 4/2001 | Parkkila ............... 455/434 |
| 633,207 A1 | 12/2001 | Wu et al. |
| 6,400,961 B1 * | 6/2002 | Lillie et al. ............... 455/552.1 |
| 6,529,727 B1 * | 3/2003 | Findikli et al. ............. 455/411 |
| 662,545 A1 | 9/2003 | La Medica et al. |

(Continued)

FOREIGN PATENT DOCUMENTS

WO WO-2005/101887 A 10/2005

*Primary Examiner* — Sharad Rampuria

(57) ABSTRACT

An exemplary method for searching one of a plurality of systems on a multi-mode device capable of communicating on a first air interface technology and a second air interface technology is disclosed. The exemplary method includes storing a default system search period for one of the air interface technologies, such as WLAN system, receiving user input representative of a user-defined system search period for the WLAN system, storing the user-defined system search period, detecting a system search event for WLAN services, searching WLAN services in response to the system search event, and terminating the WLAN system search after expiration of the user-defined search period.

4 Claims, 2 Drawing Sheets

U.S. PATENT DOCUMENTS

| | | |
|---|---|---|
| 676,616 A1 | 7/2004 | Cooper |
| 711,697 A1 | 10/2006 | Backes et al. |
| 7,251,226 B2 * | 7/2007 | Lindsay et al. ............... 370/331 |
| 735,633 A1 | 4/2008 | Bamburak et al. |
| 736,651 A1 | 4/2008 | Jaakkola et al. |
| 7,362,731 B2 * | 4/2008 | Vinayakray-Jani ........... 370/331 |
| 740,377 A1 | 7/2008 | Chandra et al. |
| 7,433,696 B2 * | 10/2008 | Dietrich et al. ............ 455/456.2 |
| 7,702,329 B1 * | 4/2010 | Durig et al. ................ 455/432.1 |
| 2003/0054809 A1 | 3/2003 | Bridges et al. |
| 2004/0014474 A1 | 1/2004 | Kanada |
| 2004/0102192 A1 | 5/2004 | Serceki |
| 2004/0253952 A1 * | 12/2004 | Rager et al. ................ 455/432.1 |
| 2005/0068928 A1 | 3/2005 | Smith et al. |
| 2005/0070275 A1 * | 3/2005 | Jeyaseelan et al. ........ 455/432.1 |
| 2005/0245269 A1 | 11/2005 | Demirhan et al. |
| 2005/0266845 A1 * | 12/2005 | Aerrabotu et al. ............ 455/436 |
| 2006/0217147 A1 | 9/2006 | Olvera-Hernandez et al. |
| 2007/0165572 A1 * | 7/2007 | Lenzarini ..................... 370/331 |
| 2008/0057960 A1 * | 3/2008 | Lahtiranta et al. ......... 455/435.2 |
| 2008/0062933 A1 | 3/2008 | Liu et al. |
| 2008/0198811 A1 * | 8/2008 | Deshpande et al. ......... 370/332 |
| 2010/0278142 A1 * | 11/2010 | Dwyer et al. ................ 370/331 |

* cited by examiner

SYSTEM SCANNING METHOD AND ARRANGEMENT FOR MOBILE WIRELESS COMMUNICATION DEVICES

CROSS-REFERENCE TO RELATED APPLICATIONS

This application is a continuation of and claims priority to U.S. non-provisional application Ser. No. 11/398,421 titled SYSTEM SCANNING METHOD AND ARRANGEMENT FOR MOBILE WIRELESS COMMUNICATION DEVICES filed Apr. 4, 2006 now U.S. Pat. No. 7,706,790, which is hereby incorporated by reference in its entirety.

FIELD OF THE INVENTION

The present invention relates to the field of wireless communication devices. More specifically, the invention relates to a system scanning technique for wireless communication devices capable of a communication over a plurality of air interface technologies.

BACKGROUND OF THE INVENTION

A typical wireless communication device, such as a mobile phone, comprises, among other things, a processor coupled to a memory and to a transceiver, each enclosed in a housing. A mobile power source, such as a battery, is coupled to and supplies power to the processor, the memory and the transceiver. A speaker and a microphone are also enclosed within the housing for transmitting and receiving, respectively, acoustic signals to and from a user of the wireless communication device. The wireless communication device communicates information by transmitting and receiving electromagnetic ("EM") energy in the radio frequency ("RF") band via an antenna coupled to the transceiver.

More recently, mobile communication devices have been developed that communicate over a plurality of air interface technologies. For example, a mobile handset may be designed to incorporate both cellular telephony technology and wireless local area network ("WLAN") technology. Such devices can be referred to as multi-mode handset devices, because of the multiple air interface modes in which the device may be configured.

A significant challenge facing the design and development of multi-mode devices is the ability to efficiently detect the presence of the networks associated with the various air interface technologies, particularly WLAN networks. The main reason for this difficulty is the fact that WLAN coverage is small and spotty (i.e., extremely limited geographically) compared to cellular network coverage, which is ubiquitous. Since the overall WLAN coverage within the cellular coverage region is comparatively small, the multi-mode device does not typically encounter a WLAN network when traveling. Because searching for WLAN services consumes a significant amount of power, the present technique requiring continuous searches for WLAN networks results in disadvantageously depleting the limited and precious mobile power source of multi-mode devices.

Other implementations provide for a fixed search time period in which to acquire WLAN services. A fixed setting (unchangeable to the user) is commonly implemented in mobile wireless communication devices in order to allow the network carrier to control the functionality and features of the device. This limitation is particularly true of system related functions, such as system searching, so that the device will have predictability in behavior. Having a fixed search time period helps conserve power, but has its own disadvantages. For example, in some cases the device will search longer than necessary and unnecessarily consume mobile power resources, as noted above. Yet in other situations, the search for WLAN service may terminate too early, thereby failing to acquire WLAN service within close proximity.

Accordingly, there is a strong need in the art for an efficient and optimized method for providing system searching or scanning for multi-mode wireless communication devices.

SUMMARY OF THE INVENTION

An exemplary method for searching one of a plurality of systems on a multi-mode device capable of communicating on a first air interface technology and a second air interface technology is disclosed. According to one embodiment, the method includes storing a default system search period for one of the air interface technologies, such as WLAN system, receiving user input representative of a user-defined system search period for the WLAN system, storing the user-defined system search period, detecting a system search event for WLAN services, searching WLAN services in response to the system search event, and terminating the WLAN system search after expiration of the user-defined search period.

According to one embodiment, the default system search period is overwritten with the user-defined system search period. In other embodiments, the default system search period and the user-defined system search period are both stored. In certain embodiments, the user-defined system search period is compared against a maximum system search period before storing the user-defined system search period in memory.

According to one embodiment, the method further includes receiving an update message via the other of the first and second air interface technologies. The update message may include an updated system search period. In response, the default system search period is overwritten with the updated system search period.

Other features and advantages of the present invention will become more readily apparent to those of ordinary skill in the art after reviewing the following detailed description and accompanying drawings.

DETAILED DESCRIPTION OF THE INVENTION

Figures 1, 2, 3:
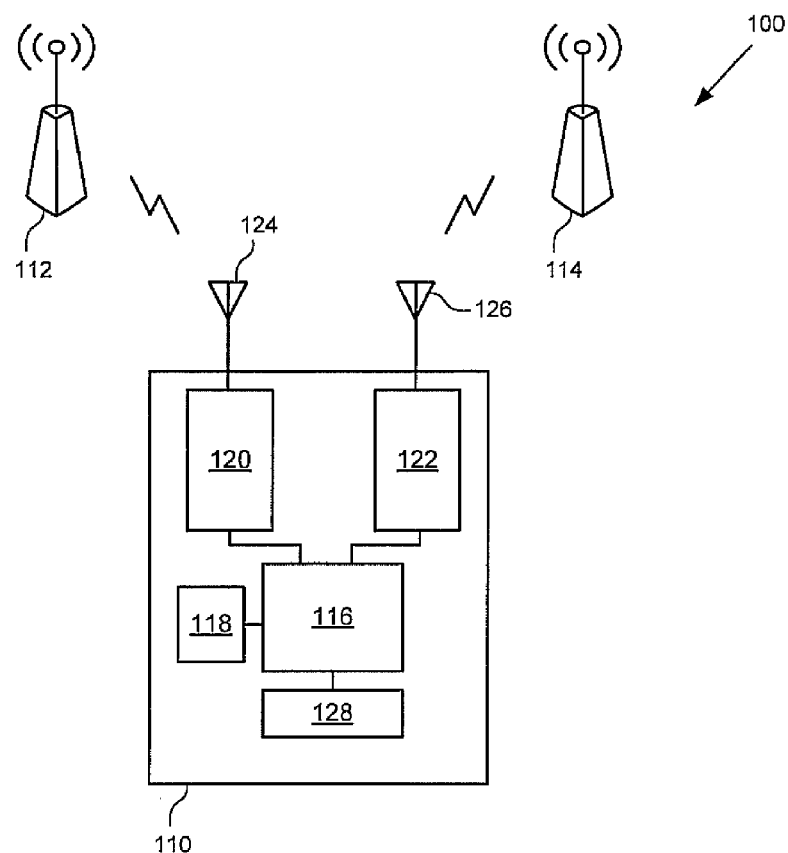
FIG. 1 illustrates a network arrangement including an exemplary multi-mode wireless communication device according to one embodiment of the present invention.
FIGS. 2 and 3 illustrate exemplary data structures for storing system searching parameters according to various embodiments of the invention.

Referring first to FIG. 1, there is shown network arrangement 100 including exemplary multi-mode wireless communication device 110 according to one embodiment of the present invention. By way of example, multi-mode device 110 may be a mobile phone capable of communicating over two or more radio access technologies. According to one particular embodiment, multi-mode device 110 is capable of communicating over one of the several of cellular networks 112 in accordance with code division multiple access (CDMA), Global System for Mobile Communications (GSM), WCDMA, or other Wireless Wide Area Networks (WWAN) standard, for example, and is further capable of communication over one of the several packet data networks 114 in accordance Wireless Local Area Networks (WLAN) protocols, for example.

As shown in FIG. 1, multi-mode device 110 comprises processor 116 coupled to memory 118 and to first transceiver 120 and second transceiver 122. Programming is stored in memory 118 and executed by processor 116 for the operation of multi-mode device 110. The details of the operation of multi-mode device 110 are described more fully below in conjunction with FIGS. 2 through 4. First transceiver 120 is coupled to antenna 124 for communication with network 112, and second transceiver 122 is coupled to antenna 16 for communication with network 114. Processor 116 is also coupled to interface 128, which may further be coupled to one or more user-interface (UI) devices (not shown), such as a display device, input keys, a microphone, and a speaker, for example.

Referring next to FIGS. 2 and 3, there are shown exemplary data structures 200 and 300 for storing system search parameters according various embodiments of the invention. As noted above in conjunction with FIG. 1, memory 118 of multi-mode device 110 stores programming executed by processor 116 during operation. Memory 118 may also store a number of settings or parameters used to configure operation of multi-mode device 110. Similarly, data structure 200 (or data structure 300), which defines system search parameters, is stored in memory 118. Other WLAN network parameters, such as geographical information ("GEO") association tags, authentication and authorization parameters, are also typically stored in memory 118.

Data structure 200 depicts one exemplary arrangement for storing system search parameters according to one embodiment. More particularly, data structure 200 defines system search period parameters for one of the two air interface technologies associated with transceivers 120 and 122 of multi-mode device 110. In the present example, data structure 200 defines the system search period parameters for WLAN interface 122. Thus, reference 222 of data structure 200 may include a reference to identify "WLAN" or transceiver 122, for example. Parameters 224A-224E may identify Service Set Identifiers ("SSIDs"), parameters 226A-226E may identify a system search period for corresponding SSIDs 224A-224E, and parameters 228A-228E may identify whether a corresponding system search period 226A-226E is enabled for user-defined values.

By way of illustration, system search period 226A may be used to store a default system search period for searching the WLAN systems associated with SSID 224A, and enabled flag 228A may indicated whether system search period 226A may be replaced with a user-defined system search period. In this particular embodiment, if enabled flag 228A is set, then the user is able to input and store a user-defined value in system search period parameter 226A for SSID 224A. Each of SSID 224B-224E has a corresponding system search period 226B-226E and enabled flag 228B-228E. In some cases, the same default system search period may be used for all SSIDs; however data structure 200 provides the ability to define a distinct default system search period for each SSID.

In operation, the system search algorithm executed by processor 116, when activated, attempts to search for and acquire the system associated with SSIDs 224A-224E for the system search period defined by corresponding parameter 226A-226E, whether default, or user-defined. SSID values 224A-224E, default search periods 226A-226E, and enabled flags 228A-228E may be initially defined when multi-mode device 110 is provisioned and/or updated during subsequent updates (e.g., over-the-air service and repair messages via cellular network 112) from the network carrier. In some embodiments, certain SSIDs (e.g., 224D-224E) may be identified as user-defined or "ad-hoc" in which case, messages from the network carrier do not modify or update its associated values.

Various algorithms for system searching would benefit from the flexibility provided by data structure 200 since the user, will have greater control over defining the system search period in accordance with the conditions proximate multi-mode device 110, as described more fully below in conjunction with FIG. 4.

Data structure 300 of FIG. 3 illustrates another exemplary arrangement for storing system search parameters according to one embodiment. By way of illustration and similar to data structure 200 of FIG. 2, data structure 300 defines the system search period parameters for WLAN interface 122 of FIG. 1. Thus, reference 322 of data structure 300 may include a reference to identify "WLAN" or transceiver 122, for example. Parameters 224A and 224B may identify a particular SSID, parameter 226A may identify a default system search period for SSID 224A, and parameter 226B may identify a user-defined system search period for SSID 224A. Parameter 328A may identify whether user-defined system search period 226B is enabled for input and/or modification. Similarly, parameter 226C may identify a default system search period for SSID 224B, parameter 226D may identify a user-defined system search period for SSID 224B, and parameter 328B may identify whether user-defined system search period 226D is enabled for input/modification. Data structure 300 differs from data structure 200 in that default system search period data 326A and 326C can be preserved even if user-defined system search period data 326B and 326D are stored. It is noted that data structures 200 and 300 are only exemplary, and other data structures for storing system search parameters may be utilized in accordance with the present invention.

In a more complex example, memory 118 can store additional search parameters, such as the frequency of searching when in the search window. In addition, the search frequency attenuation factor (where search frequency is not constant over time) can also be stored in memory. In these cases, the user may be able to define a user-defined search frequency and/or search attenuation factors for one or more SSIDs, and stored in corresponding parameters in data structure 200 or 300.

It is further noted that although in the example data structures of 200 and 300, user-defined search periods are uniquely assigned to particular SSIDs, in other embodiments, the user-defined search period can be defined to correspond to the search period or search window for searching all SSIDs for a particular system search event.

Figure 4:
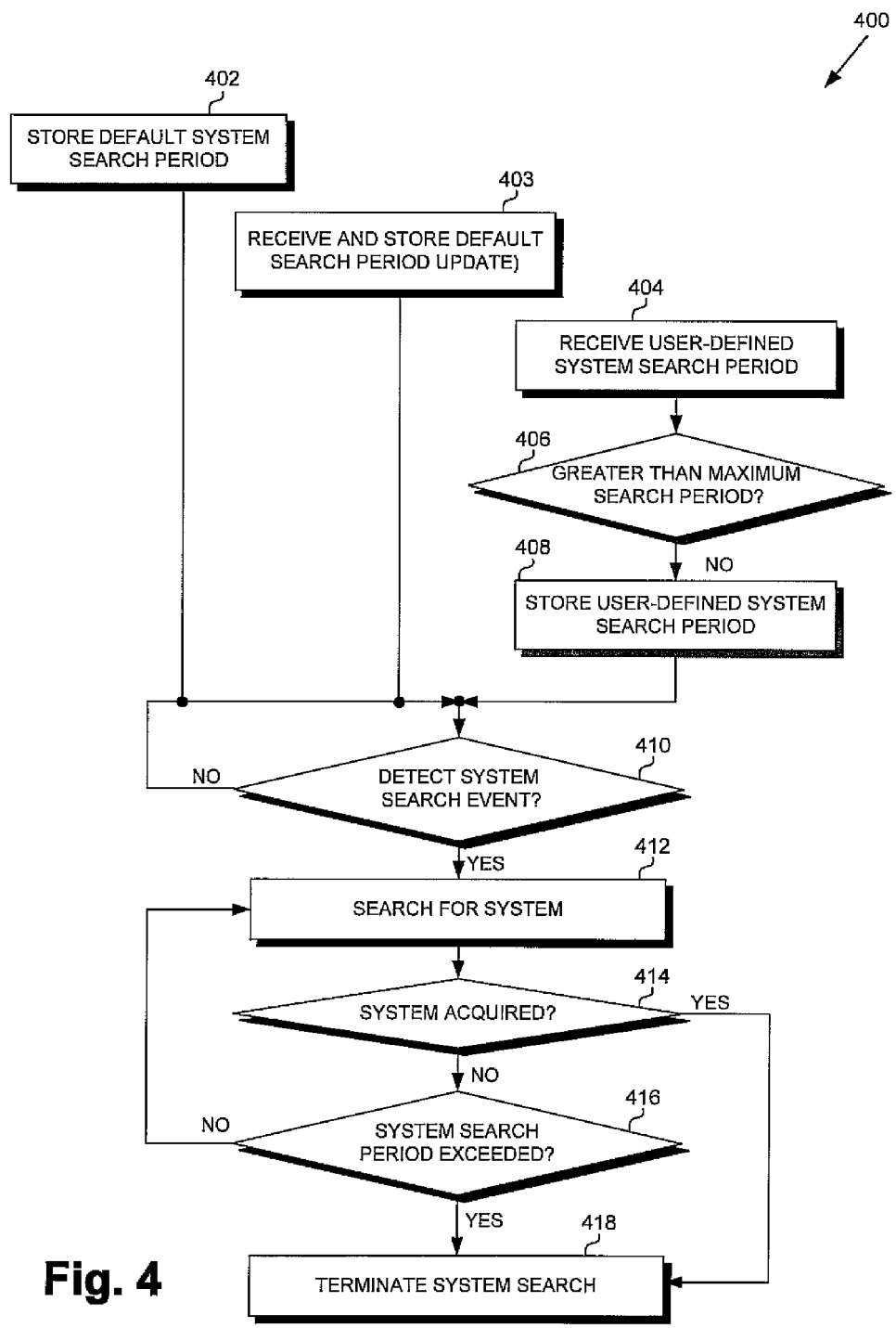
FIG. 4 illustrates an exemplary flowchart for providing system searching for a multi-mode device according to one embodiment of the invention.

Referring next to FIG. 4, there is shown exemplary flowchart 400 for providing system searching for a multi-mode device according to one embodiment of the invention. The multi-mode system searching technique depicted in FIG. 4 may be implemented in multi-mode device 110 of FIG. 1, for example. Certain details and features have been left out of flow chart 400 of FIG. 4 that would apparent to a person of ordinary skill in the art having the benefit of the present disclosure. For example, a step may consist of one or more sub-steps, as known in the art. While blocks 402 through 418 shown in flow chart 400 are sufficient to describe one embodiment of the present invention, other embodiments of the invention may utilize operations different from those shown in flow chart 400.

At block 402, the default system search period for acquiring the WLAN system is stored in memory 118 of multi-mode device 110. For example default search periods may be stored in parameters 226A-226E in data structure 200 in FIG. 2 or parameters 326A and 326C in data structure 300 of FIG. 3. As noted above, the default system search period may be defined initially during provisioning of multi-mode device 100.

At block 403, an update message via cellular network 112 is received by multi-mode device 110. The update message may include an update to one or more of the default system search periods or update flags initially stored during block 402, and/or may include one or more new sets of system search parameters (SSID, system search period, enabled flag). Responsive to the received update message, processor 116 stores the updated and/or new system search parameters in memory 118 (e.g., in data structure 200 or 300).

At block 404, user input representative of a user-defined system search period is received by multi-mode device 100. The user is able to specify a user-defined system search period for a particular SSID if permitted to do so, typically by the network carrier or multi-mode handset manufacturer. In the data structure examples discussed above in conjunction with FIGS. 2 and 3, an enabled flag can be set to indicate whether the user is able to specify a user-defined system search period for one or more systems. User input of the user-defined system search period can be received via I/O devices, such as keypads or touchscreen displays, for example, in response to prompts communicated to the user via a display screen.

At decision block 406, the received user-defined system search period can be compared to a maximum search period. For example, the maximum search period can be provisioned by network carrier of network 112 and stored in memory 118 during provisioning of multi-mode device 110 and/or updated via over the air messages over network 112. Updates to the search periods may be provided by the network carrier if, for example, the network carriers obtains updated information indicative of the such information as signal strength, coverage area, load, etc., of a specific SSID. If the user-defined system search period does not exceed the maximum search period, the user-defined system search period is stored in memory 118 at block 408. In other embodiments, the comparison against a maximum system search period can be omitted, e.g., in a situation where it is desirable to allow the user to specify a continuous search (without limit). If the maximum search period is exceed at block 406, the user may be requested to enter another value (not shown).

At block 410, if a system search event is detected, an attempt to search and acquire WLAN service is initiated at block 412. Examples of system search events include a user-initiated command to search for WLAN, automatic search triggering event based on network conditions in cellular network 112, commands issued by the network carrier via network 112, and multi-mode device 110 start-up, among others.

At decision block 414, if a WLAN network 114 is successfully acquired, authenticated and authorized, the system search is terminated at block 418, and multi-mode device 110 functions as a WLAN radio. It some cases, multi-mode device 110 may operate simultaneously as a cellular radio at the same time as the WLAN radio, or in a hybrid mode where the cellular radio is only periodically activated.

If at decision block 414 a WLAN network 114 is not successfully acquired, authenticated or authorized, a decision at block 416 is made as to whether a system search period has been exceeded. A timer may be used to determine the length of the current system search period. If a user-defined system search period is not defined or is not enabled, the current search period is compared to the default system search period, but the user-defined system search period is enabled and defined, the current search period is compared to the user-defined system search period. If the system search period (default or user-defined) is exceeded, the system search is terminated at block 418; otherwise, search for WLAN service continues at block 412. In one embodiment, if the search is terminated due to expiration of the system search period, multi-mode device 110 will not initiate a new search for WLAN service until the user or the cellular network 112 initiates a new search.

Advantageously, system searching for multi-mode devices is improved. Flexibility given to the user, when enabled, allows the user to define search parameters based on the current conditions surrounding multi-mode device 110, while retaining network carrier control of the important device settings. For example, allowing the user to extend the search periods allows the user to acquire WLAN services in a known coverage area where a static search period may have terminated the search prematurely. Conversely, allowing the user to limit the search period in areas with known limited WLAN services can significantly reduce unnecessary system searches, thereby extending valuable mobile power resources.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A method for searching a system on a multi-mode device, the method comprising:
    setting a user-defined system search period;
    searching for the system based on the user-defined system search period; and
    stopping the searching if the system has not been acquired prior to the expiration of the user-defined search period.

2. The method of claim 1, wherein the system is a wireless local area network.

3. A multi-mode device comprising:
    a processor configured to execute instructions for:
        setting a user-defined system search period;
        searching for the system based on the user-defined system search period; and
        stopping the searching if the system has not been acquired prior to the expiration of the user-defined search period.

4. The device of claim 3, wherein the system is a wireless local area network.

* * * * *